(12) United States Patent
Beigi et al.

(10) Patent No.: US 6,421,645 B1
(45) Date of Patent: *Jul. 16, 2002

(54) METHODS AND APPARATUS FOR CONCURRENT SPEECH RECOGNITION, SPEAKER SEGMENTATION AND SPEAKER CLASSIFICATION

(75) Inventors: Homayoon Sadr Mohammad Beigi, Yorktown Heights; Alain Charles Louis Tritschler, New York; Mahesh Viswanathan, Yorktown Heights, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/345,237

(22) Filed: Jun. 30, 1999

Related U.S. Application Data (63) Continuation-in-part of application No. 09/288,724, filed on Apr. 9, 1999, now Pat. No. 6,345,252.

(51) Int. Cl.[7] ............................................... G10L 15/00
(52) U.S. Cl. ........................ 704/272; 704/500; 704/275; 704/251
(58) Field of Search ................................ 704/231, 500, 704/245, 239, 241, 240, 256, 255, 251, 235, 253, 270, 257, 272, 275, 260, 236, 238

(56) References Cited

U.S. PATENT DOCUMENTS 5,659,662 A * 8/1997 Wilcox et al. .............. 704/245
6,185,527 B1 * 2/2001 Petkovic et al. ............ 704/231

OTHER PUBLICATIONS

ICASSP–97. Roy et al., "Speaker Identification based text to audio alignment for audio retrieval system". pp. 1099–1102, vol. 2. Apr. 1997.*

(List continued on next page.)

Primary Examiner—Richemond Dorvil
(74) Attorney, Agent, or Firm—Ryan, Mason & Lewis, LLP; Paul J. Otterstedt (57) ABSTRACT

A method and apparatus are disclosed for automatically transcribing audio information from an audio-video source and concurrently identifying the speakers. The disclosed audio transcription and speaker classification system includes a speech recognition system, a speaker segmentation system and a speaker identification system. A common front-end processor computes feature vectors that are processed along parallel branches in a multi-threaded environment by the speech recognition system, speaker segmentation system and speaker identification system, for example, using a shared memory architecture that acts in a server-like manner to distribute the computed feature vectors to a channel associated with each parallel branch. The speech recognition system produces transcripts with time-alignments for each word in the transcript. The speaker segmentation system separates the speakers and identifies all possible frames where there is a segment boundary between non-homogeneous speech portions. The speaker identification system thereafter uses an enrolled speaker database to assign a speaker to each identified segment. The audio information from the audio-video source is concurrently transcribed and segmented to identify segment boundaries. Thereafter, the speaker identification system assigns a speaker label to each portion of the transcribed text.

23 Claims, 5 Drawing Sheets

OTHER PUBLICATIONS

S. Dharanipragada et al., "Experimental Results in Audio Indexing," Proc. ARPA SLT Workshop, (Feb. 1996).

L. Polymenakos et al., "Transcription of Broadcast News—Some Recent Improvements to IBM's LVCSR System," Proc. ARPA SLT Workshop, (Feb. 1996).

R. Bakis, "Transcription of Broadcast News Shows with the IBM Large Vocabulary Speech Recognition System," Proc. ICASSP98, Seattle, WA (1998).

H. Beigi et al., "A Distance Measure Between Collections of Distributions and its Application to Speaker Recognition," Proc. ICASSP98, Seattle, WA (1998).

S. Chen, "Speaker, Environment and Channel Change Detection and Clustering via the Bayesian Information Criterion," Proceedings of the Speech Recognition Workshop (1998).

S. Chen et al., "Clustering via the Bayesian Information Criterion with Applications in Speech Recognition," Proc. ICASSP98, Seattle, WA (1998).

S. Chen et al., "IBM's LVCSR System for Transcription of Broadcast News Used in the 1997 Hub4 English Evaluation," Proceedings of the Speech Recognition Workshop (1998).

S. Dharanipragada et al., "A Fast Vocabulary Independent Algorithm for Spotting Words in Speech," Proc. ICASSP98, Seattle, WA (1998).

J. Navratil et al., "An Efficient Phonotactic–Acoustic system for Language Identification," Proc. ICASSP98, Seattle, WA (1998).

G. N. Ramaswamy et al., "Compression of Acoustic Features for Speech Recognition in Network Environments," Proc. ICASSP98, Seattle, WA (1998).

S. Chen et al., "Recent Improvements to IBM's Speech Recognition System for Automatic Transcription of Broadcast News," Proceedings of the Speech Recognition Workshop (1999).

S. Dharanipragada et al., "Story Segmentation and Topic Detection in the Broadcast News Domain," Proceedings of the Speech Recognition Workshop (1999).

C. Neti et al., "Audio–Visual Speaker Recognition for Video Broadcast News," Proceedings of the Speech Recognition Workshop (1999).

* cited by examiner-

FIG. 3

| | SPEAKER TURN DATABASE 300 | | | | |
|---|---|---|---|---|---|
| SEGMENT NUMBER 320 | START TIME 330 | SPEAKER LABEL (BEST GUESS) 340 | SCORE 350 | ALTERNATE SPEAKER LABEL(S) 360 | ALTERNATE SPEAKER SCORE(S) 370 |
| 1 | $T_A$ | SPEAKER X | $S_{10}$ | SPEAKER K | $S_{10-a}$ |
| 2 | $T_K$ | SPEAKER K | $S_{11}$ | SPEAKER L | $S_{11-a}$ |
| ⋮ | ⋮ | ⋮ | ⋮ | ⋮ | ⋮ |
| N | $T_E$ | SPEAKER G | $S_{12}$ | SPEAKER P | $S_{12-a}$ |

METHODS AND APPARATUS FOR CONCURRENT SPEECH RECOGNITION, SPEAKER SEGMENTATION AND SPEAKER CLASSIFICATION

This application is a continuation-in-part of U.S. patent application Ser. No. 09/288,724, filed Apr. 9, 1999, which is assigned to the assignee of the present invention and incorporated by reference herein issued as U.S. Pat. No. 6,345, 252.

FIELD OF THE INVENTION

The present invention relates generally to audio information classification systems and, more particularly, to methods and apparatus for transcribing audio information and identifying speakers in an audio file.

BACKGROUND OF THE INVENTION

Many organizations, such as broadcast news organizations and information retrieval services, must process large amounts of audio information, for storage and retrieval purposes. Frequently, the audio information must be classified by subject or speaker name, or both. In order to classify audio information by subject, a speech recognition system initially transcribes the audio information into text for automated classification or indexing. Thereafter, the index can be used to perform query-document matching to return relevant documents to the user.

Thus, the process of classifying audio information by subject has essentially become fully automated. The process of classifying audio information by speaker, however, often remains a labor intensive task, especially for real-time applications, such as broadcast news. While a number of computationally-intensive off-line techniques have been proposed for automatically identifying a speaker from an audio source using speaker enrollment information, the speaker classification process is most often performed by a human operator who identifies each speaker change, and provides a corresponding speaker identification.

The parent application to the present invention discloses a method and apparatus for retrieving audio information based on the audio content (subject) as well as the identity of the speaker. An indexing system transcribes and indexes the audio information to create time-stamped content index files and speaker index files. The generated content and speaker indexes can thereafter be utilized to perform query-document matching based on the audio content and the speaker identity. A need exists for a method and apparatus that automatically transcribes audio information from an audio source and concurrently identifies speakers in real-time. A further need exists for a method and apparatus that provides improved speaker segmentation and clustering based on the Bayesian Information Criterion (BIC).

SUMMARY OF THE INVENTION

Generally, a method and apparatus are disclosed for automatically transcribing audio information from an audio-video source and concurrently identifying the speakers. The disclosed audio transcription and speaker classification system includes a speech recognition system, a speaker segmentation system and a speaker identification system. According to one aspect of the invention, the audio information is processed by the speech recognition system, speaker segmentation system and speaker identification system along parallel branches in a multi-threaded environment.

The speech recognition system produces transcripts with time-alignments for each word in the transcript. The speaker segmentation system separates the speakers and identifies all possible frames where there is a segment boundary between non-homogeneous speech portions. The speaker identification system thereafter uses an enrolled speaker database to assign a speaker to each identified segment.

The present invention utilizes common front-end processing to compute feature vectors that are processed along parallel branches in a multi-threaded environment by the speech recognition system, speaker segmentation system and speaker identification system. Generally, the feature vectors can be distributed to the three multiple processing threads, for example, using a shared memory architecture that acts in a server-like manner to distribute the computed feature vectors to each channel (corresponding to each processing thread).

According to another aspect of the invention, the audio information from the audio-video source is concurrently transcribed and segmented to identify segment boundaries. Once the speech segments are identified by the segmentation system, the speaker identification system assigns a speaker label to each portion of the transcribed text.

The disclosed segmentation process identifies all possible frames where there is a segment boundary, corresponding to a speaker change, on the same pass through the audio data as the transcription engine. A frame represents speech characteristics over a given period of time. The segmentation process determines whether or not there is a segment boundary at a given frame, i, using a model selection criterion that compares two models. A first model assumes that there is no segment boundary within a window of samples,$(x_1, \ldots x_n)$, using a single full-covariance Gaussian. A second model assumes that there is a segment boundary within a window of samples,$(x_1, \ldots x_n)$, using two full-covariance Gaussians, with $(x_1, \ldots x_n)$ drawn from the first Gaussian, and $(x_{i+1}, \ldots x_n)$ drawn from the second Gaussian.

The disclosed speaker identification system assigns a speaker label to each identified segment, using an enrolled speaker database. The speaker identification process receives the turns identified by the segmentation process, together with the feature vectors generated by the shared-front end. Generally, the speaker identification system compares the segment utterances to the enrolled speaker database and finds the "closest" speaker. A model-based approach and a frame-based approach are disclosed for the speaker identification system.

The results of the present invention can be directly output to a user, for example, providing the transcribed text for each segment, together with the assigned speaker label. In addition, the results of the present invention can be recorded in one or more databases and utilized by an audio retrieval system, such as the audio retrieval system disclosed in the parent application, that combines the results of content and speaker searching methods to provide references to audio information (and indirectly to video) based on the audio content as well as the identity of the speaker.

A more complete understanding of the present invention, as well as further features and advantages of the present invention, will be obtained by reference to the following detailed description and drawings.

DETAILED DESCRIPTION OF PREFERRED EMBODIMENTS

Figure 1:
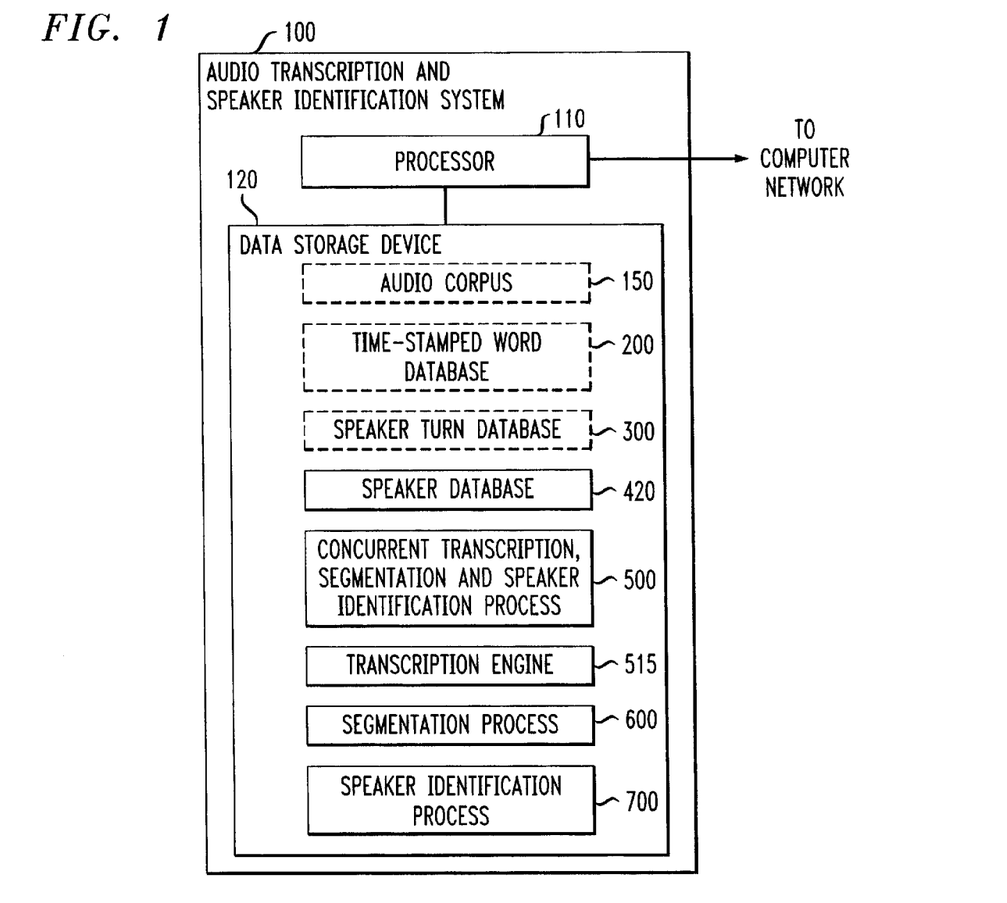
FIG. 1 is a block diagram of an audio transcription and speaker classification system according to the present invention.

FIG. 1 illustrates an audio transcription and speaker classification system 100 in accordance with the present invention that automatically transcribes audio information from an audio-video source and concurrently identifies the speakers. The audio-video source file may be, for example, an audio recording or live feed, for example, from a broadcast news program. The audio-video source is initially transcribed and concurrently processed to identify all possible frames where there is a segment boundary, indicating a speaker change.

The audio transcription and speaker classification system 100 includes a speech recognition system, speaker segmentation system and a speaker identification system. The speech recognition system produces transcripts with time-alignments for each word in the transcript. The speaker segmentation system separates the speakers and identifies all possible frames where there is a segment boundary. A segment is a continuous portion of the audio source associated with a given speaker. The speaker identification system thereafter assigns a speaker label to each segment.

FIG. 1 is a block diagram showing the architecture of an illustrative audio transcription and speaker classification system 100 in accordance with the present invention. The audio transcription and speaker classification system 100 may be embodied as a general purpose computing system, such as the general purpose computing system shown in FIG. 1. The audio transcription and speaker classification system 100 includes a processor 110 and related memory, such as a data storage device 120, which may be distributed or local. The processor 110 may be embodied as a single processor, or a number of local or distributed processors operating in parallel. The data storage device 120 and/or a read only memory (ROM) are operable to store one or more instructions, which the processor 110 is operable to retrieve, interpret and execute.

The data storage device 120 preferably includes an audio corpus database 150 for storing one or more prerecorded or live audio or video files (or both) that can be processed in real-time in accordance with the present invention. The data storage device 120 also a time-stamped word database 200, discussed further below in conjunction with FIG. 2, that is produced by the speech recognition system and includes a set of time-stamped words. A speaker turn database 300, discussed further below in conjunction with FIG. 3, that is produced by the speaker identification system, in conjunction with the speaker segmentation system, and indicates the start time of each segment, together with one or more corresponding suggested speaker labels. The speaker database 420 is produced by a speaker enrollment process 410, discussed below in conjunction with FIG. 4, and includes an entry for each enrolled speaker. It is noted that the generated databases 200 and 300 shown in the illustrative embodiment of FIG. 1 may not be required for an online implementation where the results of the present invention are displayed to a user in real-time, and are not required for subsequent access.

In addition, as discussed further below in conjunction with FIGS. 5 and 6, the data storage device 120 includes a concurrent transcription, segmentation and speaker identification process 500, a transcription engine 515, a segmentation process 600 and a speaker identification process 700. The concurrent transcription, segmentation and speaker identification process 500 coordinates the execution of the transcription engine 515, segmentation process 600 and speaker identification process 700. The concurrent transcription, segmentation and speaker identification process 500 analyzes one or more audio files in the audio corpus database 150 and produces a transcription of the audio information in real-time, that indicates the speaker associated with each segment. The segmentation process 600 separates the speakers and identifies all possible frames where there is a segment boundary. The speaker identification process 700 assigns a speaker label to each segment using an enrolled speaker database.

Figure 2:
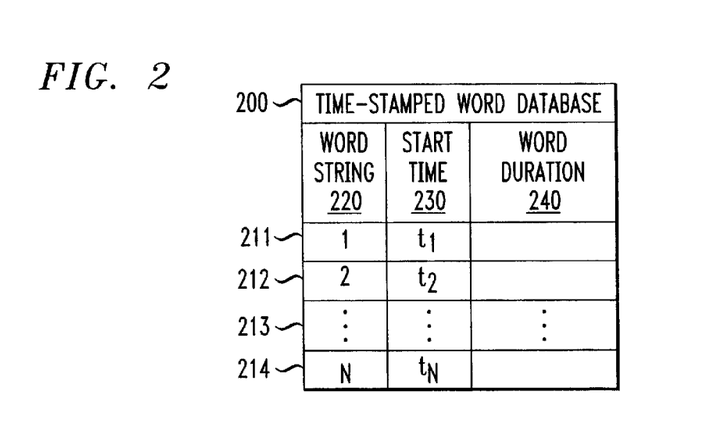
FIG. 2 is a table from the time-stamped word database of FIG. 1.

FIG. 2 illustrates an exemplary time-stamped word database 200 that is produced by the speech recognition system and includes a set of time-stamped words. The time-stamped word database 200 maintains a plurality of records, such as records 211 through 214, each associated with a different word in the illustrative embodiment. For each word identified in field 220, the time-stamped word database 200 indicates the start time of the word in field 230.

Figure 3:
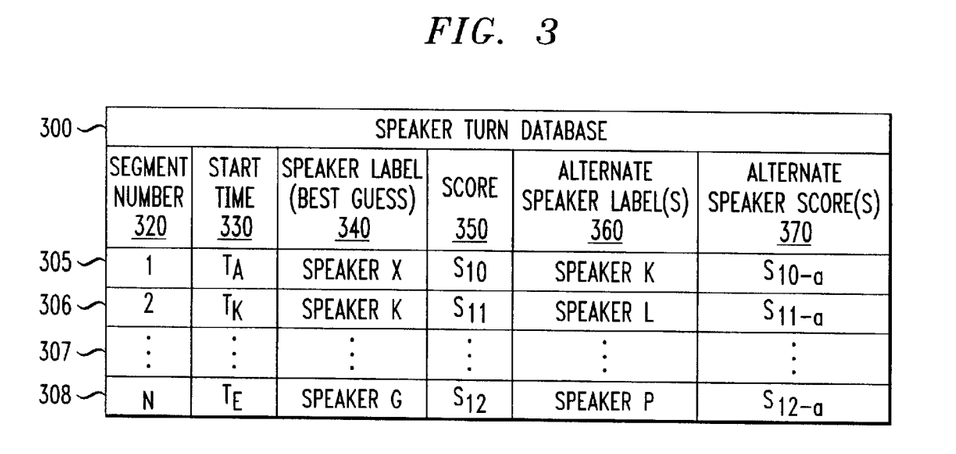
FIG. 3 is a table from the speaker turn database of FIG. 1.

FIG. 3 illustrates an exemplary speaker turn database 300 that is produced by the speaker identification system, in conjunction with the speaker segmentation system, and indicates the start time of each segment, together with one or more corresponding suggested speaker labels. The speaker turn database 300 maintains a plurality of records, such as records 305 through 308, each associated with a different segment in the illustrative embodiment. For each segment identified by a segment number in field 320, the speaker turn database 300 indicates the start time of the segment in field 330, relative to the start time of the audio source file. In addition, the speaker turn database 300 identifies the speaker associated with each segment in field 340, together with the corresponding speaker score in field 350. In one implementation, the speaker turn database 300 also identifies one or more alternate speakers (next best guesses) associated with each segment in field 360, together with the corresponding alternate speaker score in field 370.

Speaker Registration Process

Figure 4:
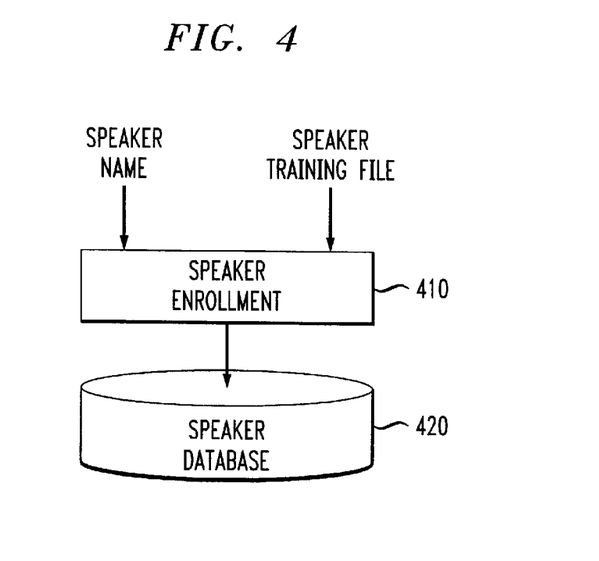
FIG. 4 illustrates a representative speaker enrollment process in accordance with the present invention.

FIG. 4 illustrates a known process used to register or enroll speakers. As shown in FIG. 4, for each registered speaker, the name of the speaker is provided to a speaker enrollment process 410, together with a speaker training file, such as a pulse-code modulated (PCM) file. The speaker enrollment process 410 analyzes the speaker training file, and creates an entry for each speaker in a speaker database 420. The process of adding speaker's voice samples to the speaker database 420 is called enrollment. The enrollment process is offline and the speaker identification system assumes such a database exists for all speakers of interest.

About a minute's worth of audio is generally required from each speaker from multiple channels and microphones encompassing multiple acoustic conditions. The training data or database of enrolled speakers is stored using a hierarchical structure so that accessing the models is optimized for efficient recognition and retrieval.

Processes

Figure 5:
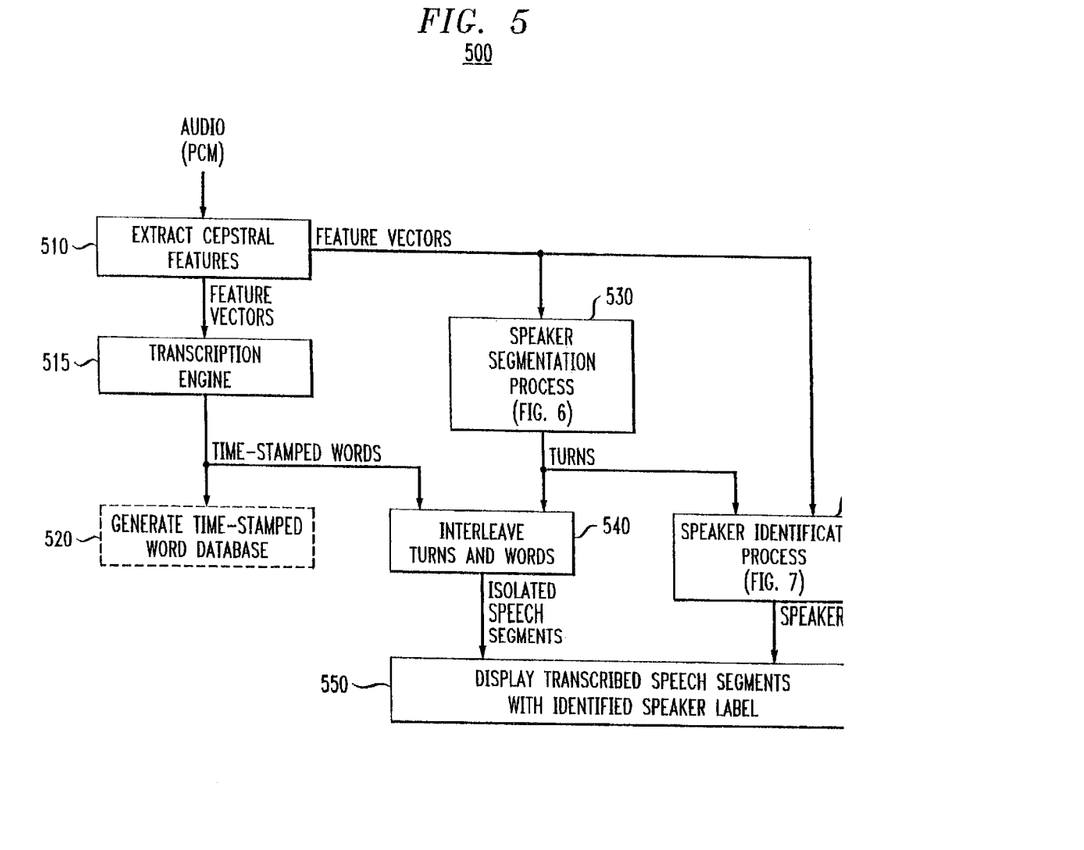
FIG. 5 is a flow chart describing an exemplary concurrent transcription, segmentation and speaker identification process performed by the audio transcription and speaker classification system of FIG. 1.
Figure 6:
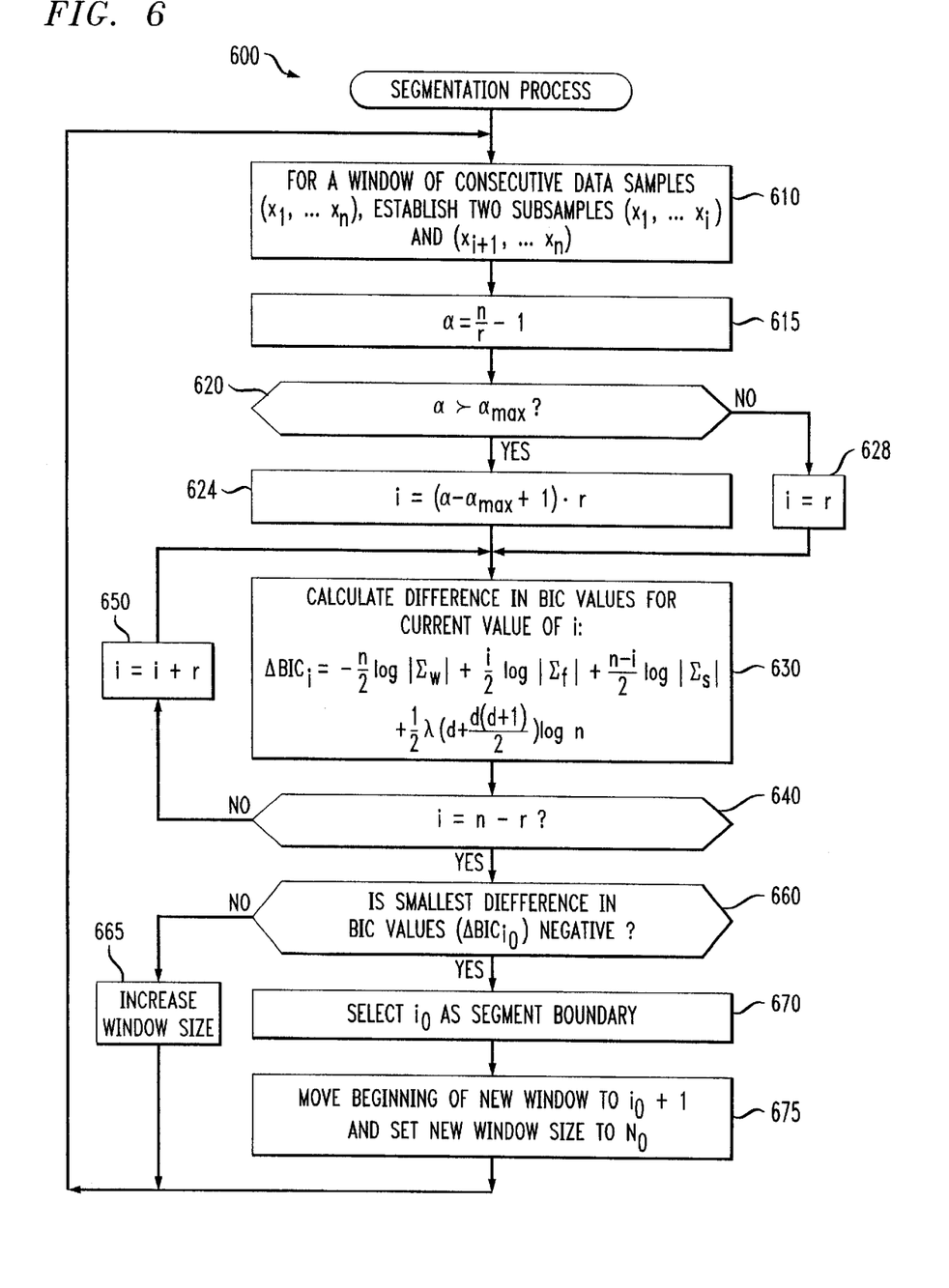
FIG. 6 is a flow chart describing an exemplary segmentation process performed by the audio transcription and speaker classification system of FIG. 1.
Figure 7:
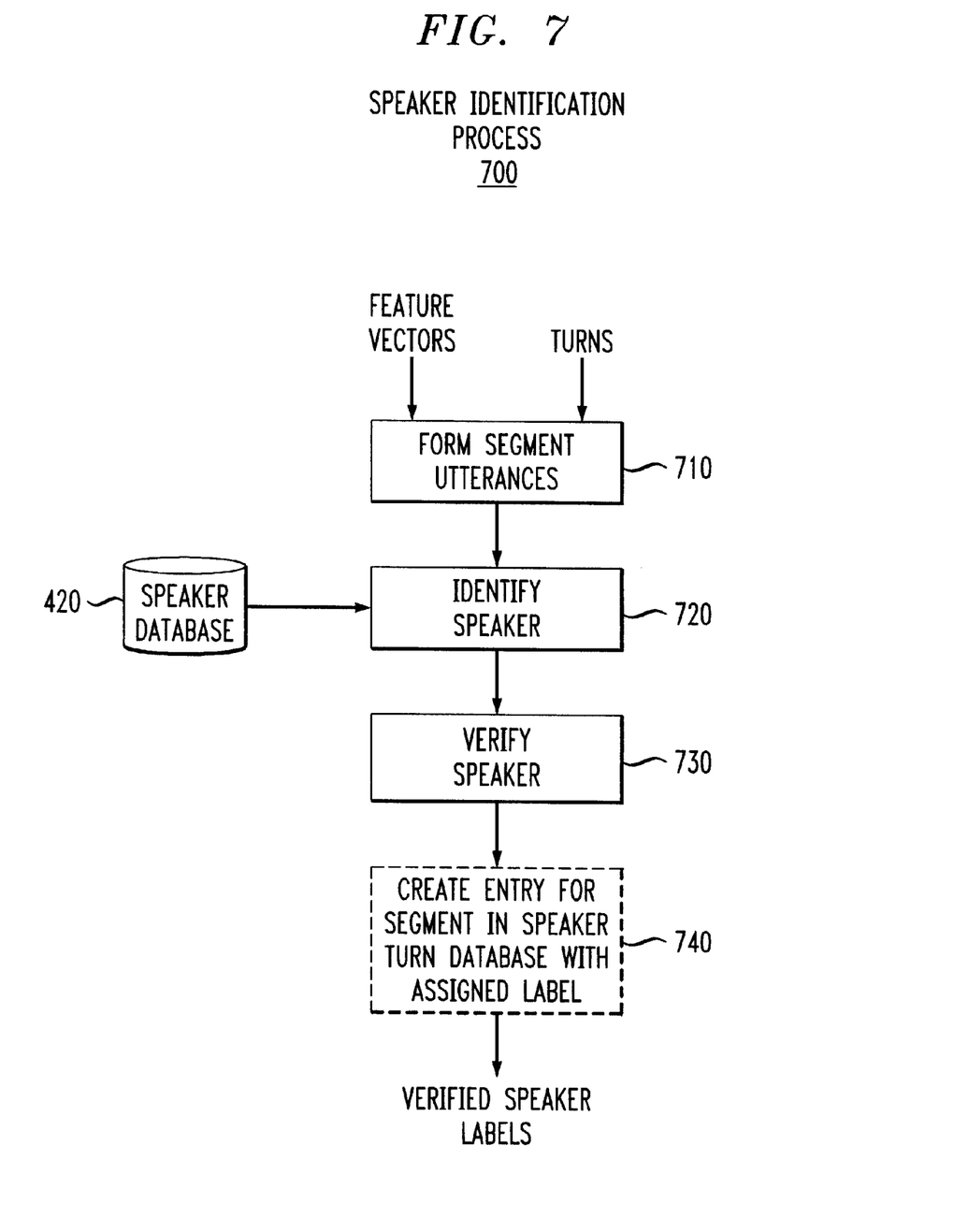
FIG. 7 is a flow chart describing an exemplary speaker identification process performed by the audio transcription and speaker classification system of FIG. 1.

As previously indicated, the concurrent transcription, segmentation and speaker identification process 500, shown in FIG. 5, coordinates the execution of the transcription engine 515, segmentation process 600 (FIG. 6) and speaker identification process 700 (FIG. 7). The concurrent transcription, segmentation and speaker identification process 500 analyzes one or more audio files in the audio corpus database 150 and produces a transcription of the audio information in real-time, that indicates the speaker associated with each segment. As shown in FIG. 5, the concurrent transcription, segmentation and speaker identification process 500 initially extracts cepstral features from the audio files during step 510, in a known manner. Generally, step 510 changes the domain of the audio signal from a temporal domain to the frequency domain, analyzes the signal energy in various frequency bands, and applies another transform to change the domain of the signal to the cepstral domain.

As shown in FIG. 5, step 510 provides common front-end processing for the transcription engine 515, segmentation process 600 (FIG. 6) and speaker identification process 700 (FIG. 7). Generally, the feature vectors computed during step 510 can be distributed to the three multiple processing threads corresponding to the transcription engine 515, segmentation process 600 (FIG. 6) and speaker identification process 700 (FIG. 7). The feature vectors can be distributed to the three multiple processing threads, for example, using a shared memory architecture that acts in a server-like manner to distribute the computed feature vectors to each channel (corresponding to each processing thread).

The feature vectors generated during step 510 are processed along parallel branches in a multi-threaded environment. As shown in FIG. 5 and discussed hereinafter, the generated feature vectors are applied using multiple threads to (i) a transcription engine during step 515, (i) the speaker segmentation process 600, discussed below in conjunction with FIG. 6, during step 530; and (iii) the speaker identification process 700, discussed below in conjunction with FIG. 7, during step 560.

The generated feature vectors are applied during step 515 to a transcription engine, such as the ViaVoice™ speech recognition system, commercially available from IBM Corporation of Armonk, N.Y., to produce a transcribed file of time-stamped words. Thereafter, the time-stamped words can optionally be collected into a time-stamped word database 200 during step 520. In addition, the time-stamped words are applied to an interleaver during step 540, discussed below.

The generated feature vectors are applied during step 530 to the segmentation process 600, discussed further below in conjunction with FIG. 6. Generally, the segmentation process 600 separates the speakers and identifies all possible frames where there is a segment boundary between non-homogeneous speech portions. Each frame where there is a segment boundary is referred to as a turn and each homogeneous segment should correspond to the speech of a single speaker. Once delineated by the segmentation process 600, each segment can be classified as having been spoken by a particular speaker (assuming the segment meets the minimum segment length requirement required for speaker recognition system).

The turns identified by the segmentation process 600, together with the feature vectors generated during step 510, are then applied to a speaker identification process 700, discussed further below in conjunction with FIG. 7, during step 560 to assign a speaker label to each segment using the enrolled speaker database 420. Generally, the speaker identification system compares the segment utterances to the speaker database 420 (FIG. 4) and finds the "closest" speaker. The assigned speaker labels produced by the speaker identification process 700 are applied to stage 550, discussed below.

The time-stamped words produced by the transcription engine during step 515, together with the speaker turns identified by the segmentation process 600 during step 530 are applied to an interleaver during step 540 to interleave the turns with the time-stamped words and produce isolated speech segments. The isolated speech segments and speaker identifications produced by the speaker identification system during step 560 are then displayed to the user during step 550.

In one implementation, the isolated speech segments are displayed in real-time as they are produced by the interleaver during step 540. In addition, in the illustrative embodiment, the minimum segment length required for the speaker recognition system is eight seconds. Thus, the speaker identification labels will generally be appended to the transcribed text approximately eight seconds after the beginning of the isolated speech segment is first presented. It is noted that if the isolated speech segment is shorter than the minimum segment length required for the speaker recognition system, then a speaker label such as "inconclusive" can be assigned to the segment.

Bayesian Information Criterion (BIC) Background

As previously indicated, the segmentation process 600, shown in FIG. 6,. separates the speakers and identifies all possible frames where there is a segment boundary between non-homogeneous speech portions. Each frame where there is a segment boundary is referred to as a turn and each homogeneous segment should correspond to the speech of a single speaker. Once delineated by the segmentation process 600, each segment can be classified as having been spoken by a particular speaker (assuming the segment meets the minimum segment length requirement required for speaker recognition system). The segmentation process 600 is based on the Bayesian Information Criterion (BIC) model-selection criterion. BIC is an asymptotically optimal Bayesian model-selection criterion used to decide which of p parametric models best represents n data samples $x_1, \ldots, x_n$, $x_i \in R^d$. Each model $M_j$ has a number of parameters, $k_j$. The samples $x_i$ are assumed to be independent.

For a detailed discussion of the BIC theory, see, for example, G. Schwarz, "Estimating the Dimension of a Model," The Annals of Statistics, Vol. 6, 461–464 (1978), incorporated by reference herein. According to the BIC theory, for sufficiently large n, the best model of the data is the one which maximizes $$BIC_j = \log L_j(x_1, \ldots, x_n) - \tfrac{1}{2}\lambda k_j \log n \qquad \text{Eq.(1)}$$

where $\lambda=1$, and where $L_j$ is the maximum likelihood of the data under model $M_j$ (in other words, the likelihood of the data with maximum likelihood values for the $k_j$ parameters of $M_j$). When there are only two models, a simple test is used for model selection. Specifically, the model $M_1$ is selected over the model $M_2$ if $\Delta BIC=BIC_1-BIC_2$, is positive. Likewise, the model $M_2$ is selected over the model $M_1$ if $\Delta BIC=BIC_1-BIC_2$, is negative.

Speaker Segmentation

The segmentation process 600, shown in FIG. 6, identifies all possible frames where there is a segment boundary. Without loss of generality, consider a window of consecutive data samples $(x_1, \ldots x_n)$ in which there is at most one segment boundary.

The basic question of whether or not there is a segment boundary at frame i can be cast as a model selection problem between the following two models: model $M_1$, where $(x_1, \ldots x_n)$ is drawn from a single full-covariance Gaussian, and model $M_2$, where $(x_1, \ldots x_n)$ is drawn from two fall-covariance Gaussians, with $(x_1, \ldots x_i)$ drawn from the first Gaussian, and $(x_{i+1}, \ldots x_n)$ drawn from the second Gaussian.

Since $x_i \in R^d$, model $M_1$ has $$k_1 = d + \frac{d(d+1)}{2}$$

parameters, while model $M_2$ has twice as many parameters ($k_2=2k_1$). It can be shown that the $i^{th}$ frame is a good candidate for a segment boundary if the expression:

$$\Delta BIC_i = -\frac{n}{2}\log|\Sigma_w| + \frac{i}{2}\log|\Sigma_f| + \frac{n-i}{2}\log|\Sigma_s| + \frac{1}{2}\lambda\left(d + \frac{d(d+1)}{2}\right)\log n$$

is negative, where $|\Sigma_w|$ is the determinant of the covariance of the whole window (i.e., all n frames), $|\Sigma_f|$ is the determinant of the covariance of the first subdivision of the window, and $|\Sigma_s|$ is the determinant of the covariance of the second subdivision of the window.

Thus, two subsamples, $(x_1, \ldots x_i)$ and $(x_{i+1}, \ldots x_n)$, are established during step 610 from the window of consecutive data samples $(x_1, \ldots x_n)$. The segmentation process 600 performs a number of tests during steps 615 through 628 to eliminate some BIC tests in the window, when they correspond to locations where the detection of a boundary is very unlikely. Specifically, the value of a variable α is initialized during step 615 to a value of n/r−1, where r is the detection resolution (in frames). Thereafter, a test is performed during step 620 to determine if the value α exceeds a maximum value, $\alpha_{max}$. If it is determined during step 620 that the value α exceeds a maximum value, $\alpha_{max}$, then the counter i is set to a value of $(\alpha-\alpha_{max}+1)r$ during step 624. If, however, it is determined during step 620 that the value α does not exceed a maximum value, $\alpha_{max}$, then the counter i is set to a value of r during step 628. Thereafter, the difference in BIC values is calculated during step 630 using the equation set forth above.

A test is performed during step 640 to determine if the value of i equals n−r. In other words, have all possible samples in the window been evaluated. If it is determined during step 640 that the value of i does not yet equal n−r, then the value of i is incremented by r during step 650 to continue processing for the next sample in the window at step 630. If, however, it is determined during step 640 that the value of i equals n−r, then a further test is performed during step 660 to determine if the smallest difference in BIC values ($\Delta BIC_{i0}$) is negative. If it is determined during step 660 that the smallest difference in BIC values is not negative, then the window size is increased during step 665 before returning to step 610 to consider a new window in the manner described above. Thus, the window size, n, is only increased when the ΔBIC values for all i in one window have been computed and none of them leads to a negative ΔBIC value.

If, however, it is determined during step 660 that the smallest difference in BIC values is negative, then $i_0$ is selected as a segment boundary during step 670. Thereafter, the beginning of the new window is moved to $i_0+1$ and the window size is set to $N_0$ during step 675, before program control returns to step 610 to consider the new window in the manner described above.

Thus, the BIC difference test is applied for all possible values of i, and $i_0$ is selected with the most negative $\Delta BIC_1$. A segment boundary can be detected in the window at frame i: if $\Delta BIC_{i0}<0$, then $x_{i0}$ corresponds to a segment boundary. If the test fails then more data samples are added to the current window (by increasing the parameter n) during step 660, in a manner described below, and the process is repeated with this new window of data samples until all the feature vectors have been segmented. Generally, the window size is extended by a number of feature vectors, which itself increases from one window extension to another. However, a window is never extended by a number of feature vectors larger than some maximum value. When a segment boundary is found during step 670, the window extension value retrieves its minimal value ($N_0$).

Variable Window Scheme

According to a further feature of the present invention, a new window selection scheme is presented that improves the overall accuracy, especially on small segments. The choice of the window size on which the segmentation process 600 is performed is very important. If the selected window contains too many vectors, some boundaries are likely to be missed. If, on the other hand, the selected window is too small, lack of information will result in poor representation of the data by the Gaussians.

It has been suggested to add a fixed amount of data to the current window if no segment boundary has been found. Such a scheme does not take advantage of the 'contextual' information to improve the accuracy: the same amount of data is added, whether or not a segment boundary has just been found, or no boundary has been found for a long time.

The improved segmentation process of the present invention considers a relatively small amount of data in areas where new boundaries are very likely to occur, and increases the window size more generously when boundaries are not very likely to occur. Initially, a window of vectors of a small size is considered (typically 100 frames of speech). If no segment boundary is found on the current window, the size of the window is increased by $\Delta N_i$ frames. If no boundary is found in this new window, the number of frames is increased by $\Delta N_{i+1}$, with $\Delta N_i=\Delta N_{i-1}+\delta_i$, where $\delta_i=2\,\delta_{i+1}$ until a segment boundary is found or the window extension has reached a maximum size (in order to avoid accuracy problems if a boundary occurs). This ensures an increasing window size which is pretty slow when the window is still small, and is faster when the window gets bigger. When a segment boundary is found in a window, the next window begins after the detected boundary, using the minimal window size.

Improving Efficiency of BIC Tests

According to another feature of the present invention, improvements in the overall processing time are obtained by better selection of the locations where BIC tests are performed. Some of the BIC tests in the window can be arbitrarily eliminated, when they correspond to locations where the detection of a boundary is very unlikely. First, the BIC tests are not performed at the borders of each window, since they necessarily represent one Gaussian with very little data (this apparently small gain is repeated over segment detections and actually has no negligible performance impact).

In addition, when the current window is large, if all the BIC tests are performed, the BIC computations at the beginning of the window will have been done several times, with some new information added each time. If no segment boundary has been found in the first 5 seconds, for example, in a window size of 10 seconds, it is quite unlikely that a boundary will be hypothesized in the first 5 seconds with an extension of the current 10 second window. Thus, the number of BIC computations can be decreased by ignoring BIC computations in the beginning of the current window (following a window extension). In fact, the maximum number of BIC computations is now an adjustable parameter, tweaked according to the speed/accuracy level required ($\alpha_{max}$ in FIG. 3).

Thus, the segmentation process 600 permits knowledge of the maximum time it takes before having some feedback on the segmentation information. Because even if no segment boundary has been found yet, if the window is big enough one knows that there is no segment present in the first frames. This information can be used to do other processing on this part of the speech signal.

BIC Penalty Weight

The BIC formula utilizes a penalty weight parameter, $\lambda$, in order to compensate for the differences between the theory and the practical application of the criterion. It has been found that the best value of $\lambda$ that gives a good tradeoff between miss rate and false-alarm rate is 1.3. For a more comprehensive study of the effect of $\lambda$ on the segmentation accuracy for the transcription of broadcast news, see, A. Tritschler, "A Segmentation-Enabled Speech Recognition Application Using the BIC," M. S. Thesis, Institut Eurecom (France, 1998), incorporated by reference herein.

While in principle the factor $\lambda$ is task-dependent and has to be retuned for every new task, in practice the algorithm has been applied to different types of data and there is no appreciable change in performance by using the same value of $\lambda$.

Speaker Identification Process

As previously indicated, the concurrent transcription, segmentation and speaker identification process 500 executes a speaker identification process 700, shown in FIG. 7, during step 560 to assign a speaker label to each segment using the enrolled speaker database 420. As shown in FIG. 7, the speaker identification process 700 receives the turns identified by the segmentation process 600, together with the feature vectors generated by the common front-end processor during step 510. Generally, the speaker identification system compares the segment utterances to the speaker database 420 (FIG. 4) and finds the "closest" speaker.

The turns and feature vectors are processed during step 710 to form segment utterances, comprised of chunks of speech by a single speaker. The segment utterances are applied during step 720 to a speaker identification system. For a discussion of a speaker identification system, see, for example, H. S. M. Beigi et al., "IBM Model-Based and Frame-By-Frame Speaker-Recognition," in Proc. of Speaker Recognition and Its Commercial and Forensic Applications, Avignon, France (1998). Generally, the speaker identification system compares the segment utterances to the speaker database 420 (FIG. 4) and finds the "closest" speaker.

The speaker identification system has two different implementations, a model-based approach and a frame-based approach with concomitant merits and demerits. The engine is both text and language independent to facilitate live audio indexing of material such as broadcast news.

Speaker Identification—The Model-Based Approach

To create a set of training models for the population of speakers in the database, a model $M_i$ for the $i^{th}$ speaker based on a sequence of M frames of speech, with the d-dimensional feature vector $\{\vec{f}_m\}_{m=1,\ldots,M}$, computed. These models are stored in terms of their statistical parameters, such as, $\{\vec{\mu}_{i,j}, \Sigma_{i,j}, \vec{C}_{i,j}\}_{j=1,\ldots,n_i}$, consisting of the Mean vector, the Covariance matrix, and the Counts, for the case when a Gaussian distribution is selected. Each speaker, i, may end up with a model consisting of $n_i$ distributions.

Using the distance measure proposed in H. S. M. Beigi et. al, A Distance Measure Between Collections of Distributions and Its Application to Speaker Recognition,' Proc. ICASSP98}, Seattle, Wash., 1998, for comparing two such models, a hierarchical structure is created to devise a speaker recognition system with many different capabilities including speaker identification (attest a claim), speaker classification (assigning a speaker), speaker verification (second pass to confirm classification by comparing label with a "cohort" set of speakers whose characteristics match those of the labeled speaker), and speaker clustering.

The distance measure devised for speaker recognition permits computation of an acceptable distance between two models with a different number of distributions $n_i$. Comparing two speakers solely based on the parametric representation of their models obviates the need to carry the features around making the task of comparing two speakers much less computationally intensive. A short-coming of this distance measure for the recognition stage, however, is that the entire speech segment has to be used to build the model of the test individual (claimant) before computation of the comparison can begin. The frame-by-frame approach alleviates this problem.

Speaker Identification—The Frame-By-Frame Approach

Let $M_i$ be the model corresponding to the $i^{th}$ enrolled speaker. $M_i$ is entirely defined by the parameter set, $$\{\vec{\mu}_{i,j}, \Sigma_{i,j}, \vec{p}_{i,j}\}_{j=1,\ldots,n_i},$$

, consisting of the mean vector, covariance matrix, and mixture weight for each of the $n_i$ components of speaker i's Gaussian Mixture Model (GMM). These models are created using training data consisting of a sequence of M frames of speech, with the d-dimensional feature vector, $\{\vec{f}_m\}_{m=1,\ldots,M}$, as described in the previous section. If the size of the speaker population is $N_p$, then the set of the model universe is $\{M_i\}_{i=1,\ldots,N_p}$. The fundamental goal is to find the i such that $M_i$ best explains the test data, represented as a sequence of N frames, $\{\vec{f}_n\}_{n=1,\ldots,N}$, or to make a decision that none of the models describes the data adequately. The following frame-based weighted likelihood distance measure, $d_{i,n}$, is used in making the decision:

$$d_{i,n} = -\log\left[\sum_{j=1}^{n_i} p_{i,j} p(\vec{f}_n | j^{th} \text{component of } \vec{M_i})\right],$$

where, using a Normal representation, $$p(\vec{f}_n | \cdot) = \frac{1}{(2\pi)^{d/2} |\Sigma_{i,j}|^{1/2}} e^{-\frac{1}{2}(\vec{f}_n - \vec{\mu}_{i,j})^t \Sigma_{i,j}^{-1} (\vec{f}_n - \vec{\mu}_{i,j})}$$

The total distance, $D_i$, of model $M_i$ from the test data is then taken to be the sum of all the distances over the total number of test frames.

For classification, the model with the smallest distance to that of the speech segment is chosen. By comparing the smallest distance to that of a background model, one could provide a method to indicate that none of the original models match very well. Alternatively, a voting technique may be used for computing the total distance.

For verification, a predetermined set of members that form the cohort of the labeled speaker is augmented with a variety of background models. Using this set as the model universe, the test data is verified by testing if the claimant's model has the smallest distance; otherwise, it is rejected.

This distance measure is not used in training since the frames of speech would have to retained for computing the distances between the speakers. The training is done, therefore, using the method for the model-based technique discussed above.

The assigned speaker label generated during step 720 can optionally be provisionally provided to the block 550 (FIG. 5) for output to the user, in a manner described below. The assigned speaker label is verified during step 730 by taking a second pass over the results of speaker classification. If the speaker identification is verified during step 730, then the speaker label is provided to the block 550 (FIG. 5) for output to the user. In addition, an entry can optionally be created in the speaker turn database 300 during step 740 indicating the best choice, together with the assigned score indicating the distance from the original enrolled speaker model to the audio test segment, and alternative choices, if desired.

It is to be understood that the embodiments and variations shown and described herein are merely illustrative of the principles of this invention and that various modifications may be implemented by those skilled in the art without departing from the scope and spirit of the invention.

What is claimed is:

1. A method for transcribing audio information from one or more audio sources, said method comprising the steps of:

transcribing said audio source to create a textual version of said audio information;

identifying potential segment boundaries in said audio source substantially concurrently with said transcribing step; and assigning a speaker label to each identified segment.

2. The method of claim 1, wherein said transcribing step produces transcripts with time-alignments for each word in said audio source.

3. The method of claim 1, wherein said identifying step identifies all possible frames where there is a segment boundary between non-homogeneous speech portions.

4. The method of claim 1, wherein said assigning step utilizes an enrolled speaker database to assign a speaker label to each identified segment.

5. The method of claim 1, wherein said assigning step further comprises the step of assigning a score indicating the confidence of said assigned speaker label.

6. The method of claim 1, wherein said assigning step further comprises the step of assigning at least one alternative choice for said assigned speaker label.

7. The method of claim 1, wherein said transcribing, identifying and assigning steps are performed on parallel processing branches in a multi-threaded environment.

8. The method of claim 1, wherein said identifying step identifies segment boundaries using a BIC model-selection criterion.

9. A method for transcribing audio information from one or more audio sources, said method comprising the steps of:

computing feature vectors from said audio information; and applying said feature vectors to three parallel processing branches to:

transcribe said audio source to create a textual version of said audio information;

identify potential segment boundaries in said audio source; and assign a speaker label to each identified segment.

10. The method of claim 9, wherein said feature vectors are applied to said parallel branches using a shared memory architecture.

11. The method of claim 10, wherein said shared memory architecture distributes the computed feature vectors to a channel corresponding to each of said parallel processing branches.

12. The method of claim 9, wherein said transcribing step produces transcripts with time-alignments for each word in said audio source.

13. The method of claim 9, wherein said identifying step identifies all possible frames where there is a segment boundary between non-homogeneous speech portions.

14. The method of claim 9, wherein said assigning step utilizes an enrolled speaker database to assign a speaker label to each identified segment.

15. The method of claim 9, wherein said assigning step further comprises the step of assigning a score indicating the confidence of said assigned speaker label.

16. The method of claim 9, wherein said assigning step further comprises the step of assigning at least one alternative choice for said assigned speaker label.

17. The method of claim 9, wherein said identifying step identifies segment boundaries using a BIC model-selection criterion.

18. A system for transcribing audio information from one or more audio sources, comprising:

a memory that stores computer-readable code; and a processor operatively coupled to said memory, said processor configured to implement said computer-readable code, said computer-readable code configured to:

transcribe said audio source to create a textual version of said audio information;

identify potential segment boundaries in said audio source substantially concurrently with said transcribing step; and assign a speaker label to each identified segment.

19. An article of manufacture, comprising:

a computer readable medium having computer readable code means embodied thereon, said computer readable program code means comprising:

a step to transcribe said audio source to create a textual version of said audio information;

a step to identify potential segment boundaries in said audio source substantially concurrently with said transcribing step; and a step to assign a speaker label to each identified segment.

20. A system for transcribing audio information from one or more audio sources, comprising:

a memory that stores computer-readable code; and a processor operatively coupled to said memory, said processor configured to implement said computer-readable code, said computer-readable code configured to:

compute feature vectors from said audio information; and apply said feature vectors to three parallel processing branches to:
(i) transcribe said audio source to create a textual version of said audio information;
(ii) identify potential segment boundaries in said audio source; and
(iii) assign a speaker label to each identified segment.

21. An article of manufacture, comprising:

a computer readable medium having computer readable code means embodied thereon, said computer readable program code means comprising:

a step to computing feature vectors from said audio information; and a step to apply said feature vectors to three parallel processing branches to:
(i) transcribe said audio source to create a textual version of said audio information; (ii) identify potential segment boundaries in said audio source; and (iii) assign a speaker label to each identified segment.

22. A method for transcribing audio information from one or more audio sources, said method comprising the steps of:

transcribing said audio source to create a textual version of said audio information;

identifying potential segment boundaries in said audio source;

assigning a speaker label to each identified segment; and presenting said textual version together with said assigned speaker labels substantially simultaneously with said transcribing, identifying and assigning steps.

23. A method for transcribing audio information from one or more audio sources, said method comprising the steps of:

computing feature vectors from said audio information;

applying said feature vectors to three parallel processing branches to: (i) transcribe said audio source to create a textual version of said audio information; (ii) identify potential segment boundaries in said audio source; and (iii) assign a speaker label to each identified segment; and presenting said textual version together with said assigned speaker labels substantially simultaneously with said transcribing, identifying and assigning steps.

* * * * *